United States Patent

Fitch et al.

Patent Number: 5,755,013
Date of Patent: May 26, 1998

[54] HOLDING FLUID CONDUITS TOGETHER

[75] Inventors: Anthony Ronald Leslie Fitch; Michael Jones, both of Swindon, United Kingdom; Andre Muller, Noisy le Roi, France

[73] Assignee: Raychem S. A., St. Christophe, France

[21] Appl. No.: 628,724

[22] PCT Filed: Oct. 20, 1994

[86] PCT No.: PCT/GB94/02296

§ 371 Date: Apr. 16, 1996

§ 102(e) Date: Apr. 16, 1996

[87] PCT Pub. No.: WO95/11400

PCT Pub. Date: Apr. 27, 1995

[30] Foreign Application Priority Data

Oct. 22, 1993 [GB] United Kingdom ............... 9321864

[51] Int. Cl.⁶ ..................................................... F16L 3/237
[52] U.S. Cl. .................. 24/16 PB; 29/447; 29/525.05; 29/525.09; 285/381.4; 403/28; 403/389
[58] Field of Search ............................ 24/16 R, 16 PB; 206/443, 497; 285/381.4, 381.5; 403/28, 389; 174/DIG. 8; 29/447, 525.05, 525.08, 525.09; 248/68.1; 428/34.9, 35.1; 156/86, 85, 84

[56] References Cited

U.S. PATENT DOCUMENTS

| 3,206,020 | 9/1965 | Billingsley et al. ........ 206/443 X |
| 3,432,129 | 3/1969 | Santucci ........................ 248/69 |
| 3,445,898 | 5/1969 | Goodrich ....................... 24/16 |
| 3,649,998 | 3/1972 | Fiorentino ................... 403/188 |
| 3,721,749 | 3/1973 | Clabburn ................. 174/DIG. 8 |
| 3,792,562 | 2/1974 | Gilliam ........................ 53/30 |
| 3,995,964 | 12/1976 | De Groef ................... 403/28 X |
| 4,268,559 | 5/1981 | Smuckler ................. 24/16 PB X |
| 4,300,284 | 11/1981 | Reeder ................. 174/DIG. 8 |
| 4,376,798 | 3/1983 | Diaz ........................ 403/28 X |
| 4,377,234 | 3/1983 | Kaplan ................... 206/497 X |
| 4,409,426 | 10/1983 | Nolf et al. ............. 174/DIG. 8 |
| 4,413,028 | 11/1983 | Diaz ........................ 428/35.1 |
| 4,425,390 | 1/1984 | Changani et al. ........ 174/DIG. 8 |
| 4,438,294 | 3/1984 | Meltsch et al. ......... 174/DIG. 8 |
| 4,795,114 | 1/1989 | Usui et al. .................... 248/62 |
| 5,002,244 | 3/1991 | Holbury et al. ............ 248/68.1 |
| 5,129,608 | 7/1992 | Goldman ................... 248/74.3 |

FOREIGN PATENT DOCUMENTS

| 96109 | 2/1968 | France . |
| 2247731 | 3/1992 | United Kingdom . |

*Primary Examiner*—James R. Brittain
*Attorney, Agent, or Firm*—Herbert G. Burkard; Sheri M. Novack

[57] ABSTRACT

Method and articles for holding fluid conduits at a desired lateral distance from each other for connection to spaced-apart connection points, for example vehicle fuel line connections or domestic appliance flexible hoses. Preferred holding articles are described having heat-shrinkable rings connected by an integral connecting portion, or having a sheet with heat-shrinkable end portions (30) which can be wrapped around conduits (70) and a spacer (50) to hold the conduits at the required separation.

16 Claims, 1 Drawing Sheet

HOLDING FLUID CONDUITS TOGETHER

This invention provides a method of holding two or more fluid conduits together at a predetermined lateral distance from one another, comprising the steps of (a) providing a holding article composed of thermoplastic (preferably cross-linked thermoplastic) polymeric material comprising at least two dimensionally heat-recoverable portions of the polymeric material connected together at the said predetermined distance by a connecting portion of the polymeric material substantially integral with the recoverable portions, (b) placing the said heat-recoverable portions of the holding article around the conduits to be held together, and (c) recovering the heat-recoverable portions to grip the conduits, thereby holding the conduits at the said predetermined distance from one another.

Methods according to this invention are especially useful for holding fluid conduits side-by-side at the said predetermined distance from one another, and are especially advantageous for holding vehicle fuel lines, or other fluid conduits for a vehicle or for a domestic appliance, especially flexible hoses, for example cooling hoses, at a distance corresponding to the spacing of connection points carried by the vehicle or appliance. The ends of the conduits so held may then be conveniently aligned with and connected to the connection points. For such purposes, the holding articles used according to this invention will preferably be applied near the ends of the hoses or other elongate conduits, although additional holding articles may be applied at one or more positions between the conduit ends to enhance stability.

Dimensionally recoverable articles, preferably heat-recoverable articles, and materials and methods for making them are generally well known. The specialised holding articles of the present invention may be formed, for example, so that the heat-recoverable portions are open-ended rings or tubes of the thermoplastic material and the connecting portion extends between the rings or tubes. In that case, the rings or tubes could be expanded to their heat-recoverable state by the well-known technique of hot expansion using a suitable mandrel, without expanding the connecting portion which may be in the form of a simple web. It is well known in this field of technology that cross-linked thermoplastics are preferred for high-performance heat-recoverable articles, although heat-recoverability may also be imparted to uncrosslinked thermoplastics.

One preferred form of holding article for use in the method of this invention comprises a continuous body of thermoplastic (preferably cross-linked thermoplastic) polymeric material having at least two open-ended dimensionally heat-recoverable rings or tubes of the polymeric material laterally connected together by a connecting portion of the polymeric material substantially integral with the recoverable portions at a distance from one another such that recovery of the said rings or tubes about fluid conduits in use will hold the conduits at a distance from one another corresponding to the spacing of conduit connection points carried by a vehicle or domestic appliance to which the conduits are to be connected.

Alternatively, a holding article for use in the method of this invention may be in the form of a sheet or strip, longitudinally separated portions (preferably opposite end portions) of which comprise the said heat-recoverable portions having the connecting portion therebetween. The recoverable portions can thus be wrapped and secured around the conduits in use prior to the recovery. In this case, the ends of the recoverable portions remote from the connecting portion could be attached at or near their own other ends (ie. their ends nearer to the connecting portion) so as to form recoverable loops separated by the connecting portion. However, it may be preferable that at least one connecting portion of the sheet or tape carries a spacer body against which the conduits are pressed to hold them at the said distance from one another after the recoverable portions of the sheet or tape have been wrapped and secured and recovered about the conduits. The remote ends of the recoverable portions in this case may be attached to the spacer body, or preferably opposed ends of the sheet or tape are adapted to be fixed together so that the sheet or tape forms a single tube surrounding the spacer body (and surrounding the conduits in use). Preferably the spacer body is fixed to the connecting portion of the sheet or tape, for example by adhesive, or by being formed integrally with the sheet or tape (for example by moulding or preferably by extrusion). The articles could also be woven or otherwise assembled from inherently heat-recoverable fibres.

The invention includes the holding article when it has been recovered about the conduits to hold them at the said predetermined distance from each other. The conduits about which the holding article is recovered in use may for example be arranged side-by-side with one another, an especially useful example being the aforementioned fuel lines for a vehicle or other conduits for vehicles or domestic appliances, which may be held together at a predetermined spacing for connection to a vehicle or appliance. This can be especially advantageous in mass production processes where time is at a premium.

The invention also provides a kit comprising a sheet or tape and a separate spacer body which can be assembled to provide a holding article according to this invention having the spacer body in contact substantially only with the said connecting portion of the tape or sheet.

It will be understood that the recoverable portions of the holding articles according to this invention are preferably in the form of, or capable of forming, a tube, whose tubular length is not more than twice its inside diameter, preferably not more than its inside diameter per se. Longer tubes may, however, be preferred, e.g. in arrangements where enhanced resistance is desired to torsional displacement of parallel objects about a transverse axis passing through each of the said objects, e.g. in the case of relatively rigid conduits or pipes. The wall thickness of the recoverable portions when fully recovered is not critical, but will usually not be more than 1 cm, preferably not more than 0.5 cm, especially not more than 0.3 cm, and will usually be at least 0.05 cm, preferably at least 0.1 cm.

For the wraparound sheet or tape versions described above, any of the known closure means for wraparound heat-recoverable articles may be used, for example hooks, adhesives, snap-fit interlocking formations, or the famous Raychem "rail-and-channel" closures.

Specific embodiments of the present invention will now be described by way of example with reference to the accompanying drawings, wherein.

Figure 1:
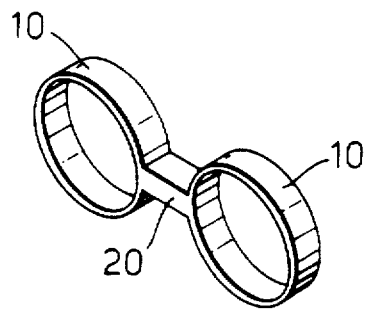
FIG. 1 Shows in perspective a simple holding article.

Referring to FIG. 1, the article is moulded, or alternatively extruded as a pair of longer interconnected tubes and cut to the illustrated length, from known material such as polyolefin, EVA copolymer, or preferably a block polyether/polyester-based material (for example based on "Hytrel" copolymers) and is cross-linked by known chemical cross-linking agents and methods. The two rings 10 are thereafter expanded to the heat-recoverable state by insertion of a stretching mandrel into the rings at a temperature above the crystalline melting point of the material, followed by cooling to retain the expanded shape until later reheating causes heat recovery, as known per se. The connecting portion 20 remains undeformed and so serves to hold the recoverable portions 10 at a predetermined distance from each other both before and after heat recovery of the rings 10. Conduits, for example vehicle fuel hoses, can readily be arranged to pass through the expanded rings 10 and will thus be held at a predetermined distance from each other after heat-recovery of the rings 10 to grip the conduits.

Figure 2:
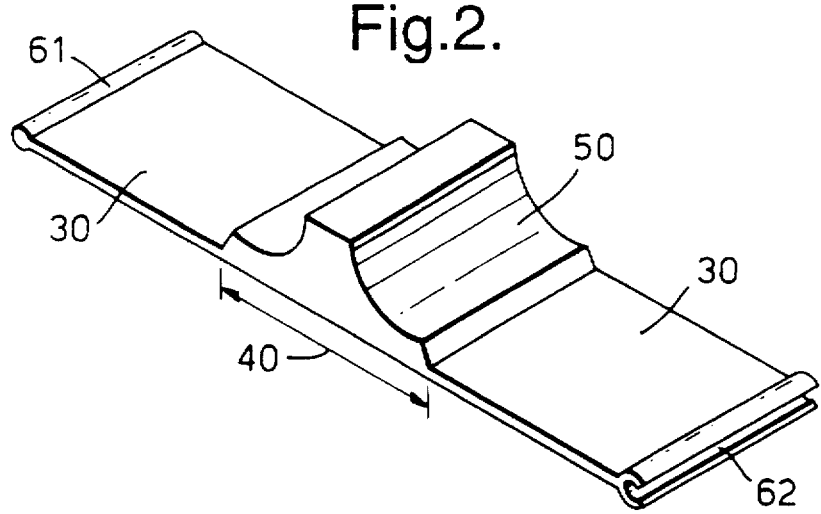
FIG. 2 shows in perspective a wrap-around sheet or tape article carrying spacer body.

The sheet or tape article of similar material shown in FIG. 2 has heat-recoverable end portions 30 separated by the heat-stable connecting portion 40, which carries a spacer body 50. The ends of the sheet or tape carry snap-fit fastenings 61, 62, which are capable, when fitted together, of resisting the forces generated by the heat recovery of the rings 10 about the objects in question. The spacer body and fastenings in this example are formed integrally with the sheet or tape, for example by moulding or extrusion. The article is cross-linked by chemical reagents or by ionising radiation as known per s e, and the recoverable portions 30 are stretched while hot followed by cooling to fix them in the heat-recoverable state in the usual way.

Figure 3:
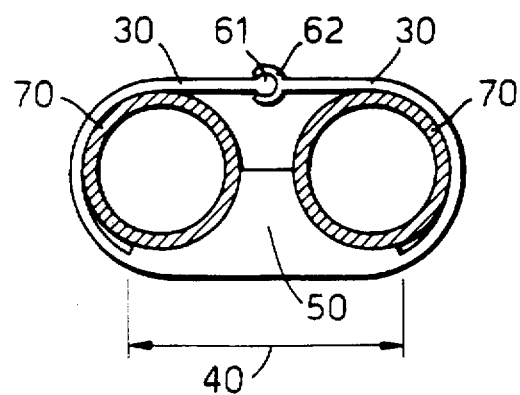
FIG. 3 shows an end view of the article of FIG. 2 applied to a pair of fluid conduits.

FIG. 3 shows the article of FIG. 2 wrapped around a pair of fluid conduits such as vehicle fuel hoses 70, with the snap-fit fastenings 61, 62 assembled to hold the sheet or tape in the form of a single tube surrounding the hoses 70 and the spacer body 50. Heat recovery of the recoverable portions 30 then causes the article to grip the hoses 70, pressing them against the spacer body 50, to hold them at the desired predetermined distance from each other for connection to a vehicle.

We claim:

1. A method of holding two or more fluid conduits together a predetermined lateral distance from one another, comprising the steps of
   (a) providing a holding article composed of thermoplastic polymeric material comprising at least two dimensionally heat-recoverable portions of the polymeric material connected together at the said predetermined distance by a connecting portion of the polymeric material substantially integral with the recoverable portions,
   (b) placing the said heat recoverable portions of the holding article around the conduits to be held together, and
   (c) recovering the heat-recoverable portions to grip the conduits, thereby holding the conduits at the said predetermined distance from one another,
   wherein the said connecting portion is substantially dimensionally stable under the conditions applied in practice to recover the said recoverable portions, thereby holding the conduits at the said predetermined distance from one another after the recovering step.

2. A method according to claim 1, wherein the said heat-recoverable portions of the holding article are open-ended rings or tubes of the polymeric material and the connecting portion extends laterally between the rings or tubes.

3. A method according to claim 1 wherein the said holding article is in the form of a sheet or strip, longitudinally separated portions of which comprise the said heat-recoverable portions having the connecting portion therebetween, and the recoverable portions are wrapped and secured around the said conduits prior to the recovery step.

4. A method according to claim 3, wherein at least one connecting portion of the sheet or tape carries a spacer body against which the said conduits are pressed to hold them at the said distance from one another after the recoverable portions of the sheet or tape have been wrapped and secured and recovered about the said conduits.

5. A method according to claim 4, wherein opposed ends of the sheet or tape are adapted to be fixed together and the method includes the step of fixing them together so that the sheet or tape forms a single tube surrounding the spacer body and the said conduits.

6. A method according to claim 4 or 5, wherein the spacer body is fixed to or integral with the connecting portion of the sheet or tape.

7. A holding article for use in a method according to claim 3, in the form of a sheet or tape of thermoplastic polymeric material, longitudinally separated portions of which sheet or tape are dimensionally heat-recoverable and are connected together by a connecting portion of the sheet or tape substantially integral with the recoverable portions so that the recoverable portions can be wrapped, and secured and heat-recovered around conduits to be held thereby in use at a predetermined distance from one another.

8. An article according to claim 7, wherein at least one connecting portion of the sheet or tape carries a spacer body against which the conduits will be pressed to hold them at the said distance from one another after the recoverable portions of the sheet or tape in use have been wrapped, secured and recovered about the said conduits.

9. An article according to claim 8, wherein opposed ends of the sheet or tape are adapted to be fixed together so that the sheet or tape will form a single tube surrounding the spacer body.

10. An article according to claim 7, wherein the thermoplastic is cross-linked thermoplastic.

11. A method according to claim 1, wherein the said conduits are fuel lines for a vehicle or other fluid conduits for a vehicle or for a domestic appliance.

12. A method according to claim 11, wherein at least two conduits are held together at a distance from one another corresponding to the spacing of conduits of the vehicle or appliance.

13. A holding article for use in a method according to claim 12, comprising a continuous body of thermoplastic polymeric material having at least two open-ended dimensionally heat-recoverable rings or tubes of the polymeric material laterally connected together by a connecting portion of the polymeric material which is substantially dimensionally stable under the conditions applied in practice to recover the said rings or tubes and which is substantially integral with the recoverable portions and holds them at a predetermined distance from one another corresponding to the spacing of conduits carried by a vehicle or domestic appliance to which the conduits are to be connected such that recovery of the said rings or tubes about fluid conduits in use will hold the conduits at the said predetermined distance from one another after the heat recovery.

14. Vehicle fuel lines or other fluid conduits held together at a predetermined spacing for connection to a vehicle or domestic appliance by an article according to claim 13.

15. An article according to claim 13, wherein the thermoplastic is cross-linked thermoplastic.

16. An article according to claim 1, wherein the thermoplastic is cross-linked thermoplastic.

* * * * *